(12) United States Patent
Hyvarinen et al.

(10) Patent No.: US 11,046,526 B1
(45) Date of Patent: Jun. 29, 2021

(54) CONVEYOR GUIDE WHEEL

(71) Applicant: Frost Tech LLC, Grand Rapids, MI (US)

(72) Inventors: Richard A. Hyvarinen, Hastings, MI (US); Charles J. Deschaine, Walker, MI (US)

(73) Assignee: Frost Tech LLC, Grand Rapids, MI (US)

( * ) Notice: Subject to any disclaimer, the term of this patent is extended or adjusted under 35 U.S.C. 154(b) by 0 days.

(21) Appl. No.: 16/911,124

(22) Filed: Jun. 24, 2020

(51) Int. Cl.
*B65G 17/38* (2006.01)
*F16C 19/14* (2006.01)
*F16C 33/66* (2006.01)

(52) U.S. Cl.
CPC .............. *B65G 17/38* (2013.01); *F16C 19/14* (2013.01); *F16C 33/6659* (2013.01); *F16C 33/6681* (2013.01); *F16C 33/6685* (2013.01); *B65G 2812/02376* (2013.01); *F16C 2326/58* (2013.01)

(58) Field of Classification Search
CPC .................. B65G 17/38; B65G 17/385; B65G 2812/02376; F16C 33/6681; F16C 19/14; F16C 2326/58; F16C 33/6659; F16C 33/6685; F16C 33/1045; F16C 33/6622
See application file for complete search history.

(56) References Cited

U.S. PATENT DOCUMENTS

| | | | | |
|---|---|---|---|---|
| 3,762,784 A | * | 10/1973 | Pachuta | F16C 19/548 384/473 |
| 4,339,159 A | * | 7/1982 | Miller | B65G 39/09 384/539 |
| 4,384,387 A | * | 5/1983 | Pachuta | B65G 39/09 16/107 |
| 4,408,808 A | * | 10/1983 | Redmann, Jr. | F16C 19/184 384/473 |
| 6,070,711 A | * | 6/2000 | Murano | B65G 17/38 198/712 |
| 6,257,397 B1 | * | 7/2001 | Kilby | A21C 13/02 198/800 |
| 6,450,326 B1 | * | 9/2002 | Hoffmann | B65G 17/20 104/172.5 |

(Continued)

OTHER PUBLICATIONS

"KR 1831386 B1, Derwent" (Year: 2018).*

*Primary Examiner* — Mark A Deuble
(74) *Attorney, Agent, or Firm* — Mitchell Intellectual Property Law, PLLC

(57) ABSTRACT

A conveyor chain and horizontally oriented guide wheel having a hub, an outer wheel rotatable about the hub and a bearing race between said hub and said outer wheel. An oiling gap, the top opening of which is located radially inwardly of the bearing race, extends outwardly and downwardly and opens into said bearing race, such that a direct downward path to the bearings is eliminated. The hub and the inside of the outer wheel have opposed frustroconical surfaces which define a frustroconical path from the top wheel surface oiling gap opening to the wheel bearings. The guide wheel also includes a blow out gap on the bottom side which is formed by a blow out path which becomes wider than the bearing race as it proceeds downwardly to its opening at the bottom of the wheel, making it easier for debris to be blown out of the bearings either from air blown down through the oiling gap at the top or blown up from the blow out gap at the bottom.

14 Claims, 5 Drawing Sheets

(56) References Cited

U.S. PATENT DOCUMENTS

| | | | | |
|---|---|---|---|---|
| 8,985,279 | B2* | 3/2015 | Wakamatsu | F16C 13/006 |
| | | | | 184/26 |
| 2005/0061637 | A1* | 3/2005 | Kilby | A21C 13/02 |
| | | | | 198/852 |
| 2016/0354876 | A1* | 12/2016 | Frost | B23P 6/00 |
| 2018/0259037 | A1* | 9/2018 | Lavigno, IV | B60B 19/00 |
| 2020/0240469 | A1* | 7/2020 | Ayama | F16C 33/586 |
| 2020/0346871 | A1* | 11/2020 | Hyvarinen | B65G 39/20 |

* cited by examiner

CONVEYOR GUIDE WHEEL

FIELD AND BACKGROUND

The present invention relates to the field of conveyor guide wheels, especially horizontal guide wheels. Bakery conveyor chains typically employ chain links in which every other link includes a horizontal guide wheel, as illustrated for the present invention in FIG. 1. (See FIG. 1).

The horizontal guide wheels 2 on conveyor chains typically include a fixed non-rotating center hub 3, one row or two parallel rows of ball bearings 4 disposed in races around the hub, and an outer wheel 5 which rotates on bearings 4 (FIGS. 2 & 3). The bearings are at least partially exposed through a top oiling gap 6 between the perimeter of the hub 3 and the perimeter of the outer wheels 5, which allows oil to flow into the bearings to keep them lubricated. Unfortunately, the oiling gap 6 also allows dirt and debris fall down into the bearings in use. The dirt and debris tend to gum up the oil in use, which make the necessity of oiling more frequent.

In addition, many manufacturers and customers prefer the use of a single row of larger ball bearings in the race because wear is minimized, and longevity is enhanced. Unfortunately, the use of larger balls requires a larger oiling gap 6 between the hub and outer wheel, enhancing the flow of dirt and debris into the bearings.

To overcome the dirt and debris problem, one or more "blow out stations" are positioned along the track of the conveyor chain. Air under pressure is directed into the guide wheel bearings through the oiling gap 6, for the purpose of blowing dirt and debris out of the bearings through a bottom "clear out" gap 7 on the bottom side of horizontal guide wheel. Alternatively, or in addition, air can be blown up through the clear out gap and out through the oiling gap 6.

Another problem with horizontal guide wheels occurs at the oiling stations positioned adjacent the chain path. As oil is sprayed down on the horizontal guide wheels, it tends to pool on top 8 of the hub. This inefficiency of oiling increases the oil consumption necessary to keep the guide wheels well oiled.

Such conveyor chains and horizontal guide wheels 1 have been used in the conveyor chain industry for well over 50 years.

SUMMARY OF THE INVENTION

The horizontal guide wheels of the present invention include an oiling gap, the top opening of which is located radially inwardly of the bearing race and which extends outwardly and downwardly and opens into said bearing race, such that a direct downward path to the bearings is eliminated. Preferably, the hub and the inside of the outer wheel have opposed frustroconical surfaces which define a frustroconical path from the top wheel surface oiling gap opening to the wheel bearings. This makes it more difficult for dirt and debris to fall into the bearings, and preferably the gap is located sufficiently far inwardly that it eliminates the flat top surface of the hub altogether such that oil pooling does not occur.

In a preferred embodiment, the guide wheel also includes a blow out gap on the bottom side which is formed by a blow out path which becomes wider than the bearing race as it proceeds downwardly to its opening at the bottom of the wheel. This making it easier for debris to be blown out of the bearings either from air blown down through the oiling gap at the top or blown up from the blow out gap at the bottom.

These and other objects, advantages and features of the invention will be more fully appreciated by reference to the description of the preferred embodiments and appended drawings.

DESCRIPTION OF THE PREFERRED EMBODIMENT

Figure 1:
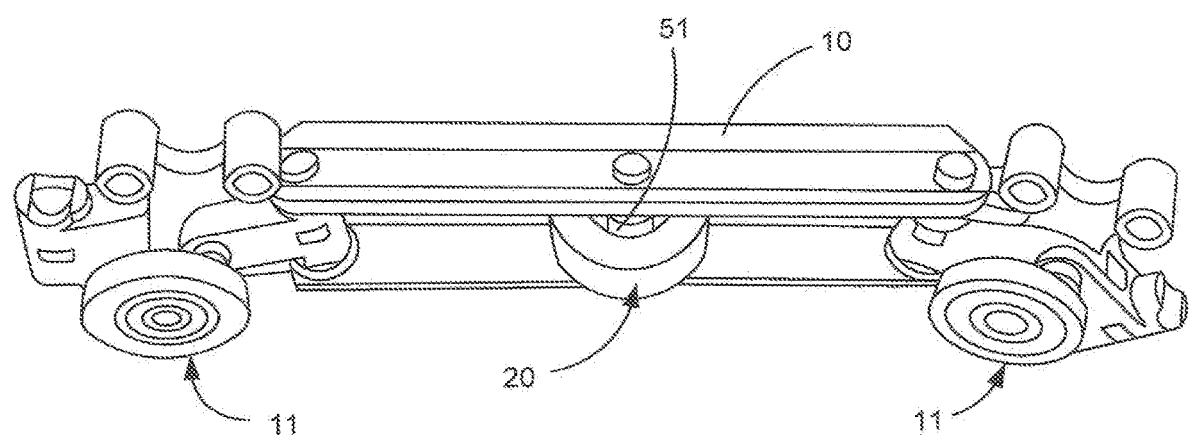
FIG. 1 is a side elevation of a section of conveyor chain having a horizontally oriented guide wheel.
Figure 2:
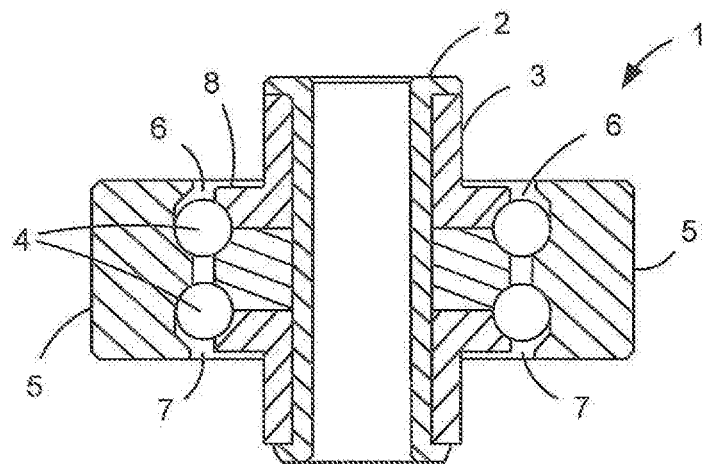
FIG. 2 is a vertical cross section of a prior art horizontally oriented guide wheel.
Figure 3:
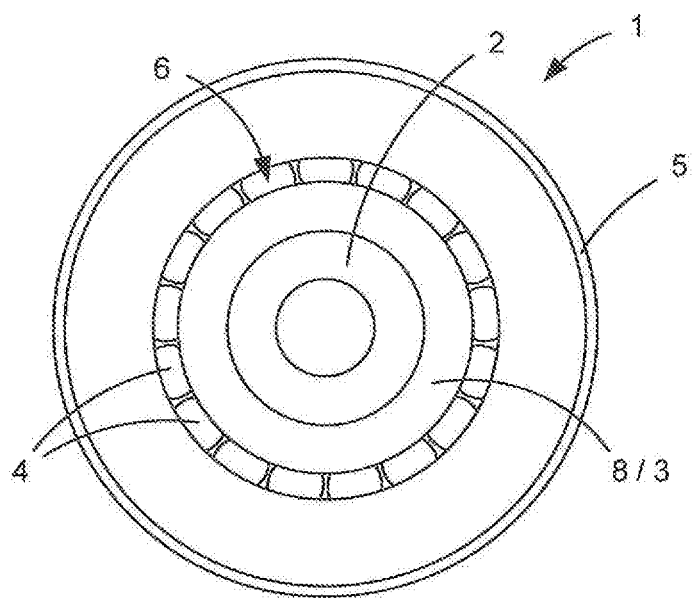
FIG. 3 is a top plan view of a prior art horizontally oriented guide wheel.

The various components of the preferred embodiment guide wheel and environs of the present invention are identified and numbered as follows:

Guide link 10
Wheeled links 11
Horizontal guide wheel 20
   Wheel hub 30
      Hub sleeve 31
      Upper hub 31a
      Lower hub 31b
      Hub Top stem 32
      Hub upper frustroconical surface 33
      Hub bearing race groove 34
      Hub lower frustroconical surface 35
      Hub bottom stem 36
   Outer Wheel 40
      Wheel upper frustroconical interior surface 43
      Wheel bearing race groove 44
      Wheel lower frustroconical interior surface 45
   Bearing race 50
      Oiling gap 51
      Blow out gap 52
   Ball bearings 60

Figure 4:
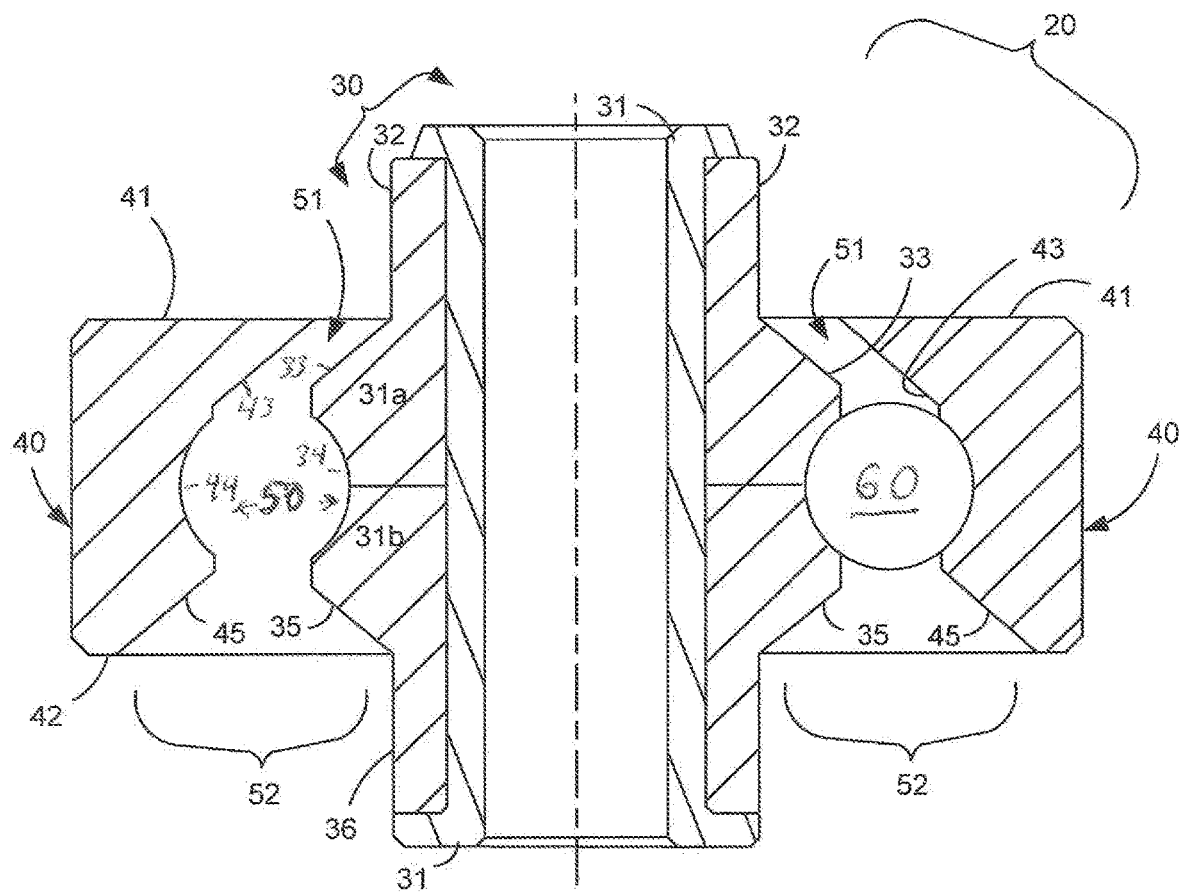
FIG. 4 is a vertical cross section of a preferred embodiment horizontally oriented guide wheel.
Figure 5:
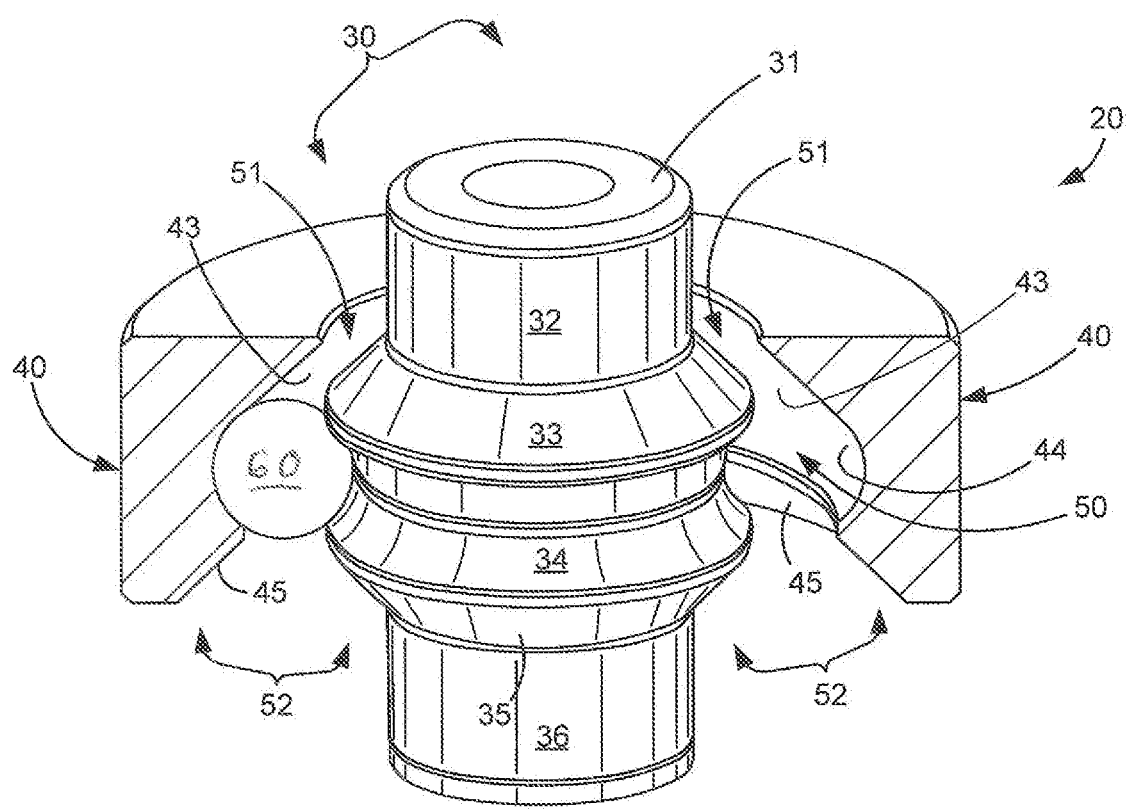
FIG. 5 is a top plan view of a preferred embodiment horizontally oriented guide wheel.
Figure 6:
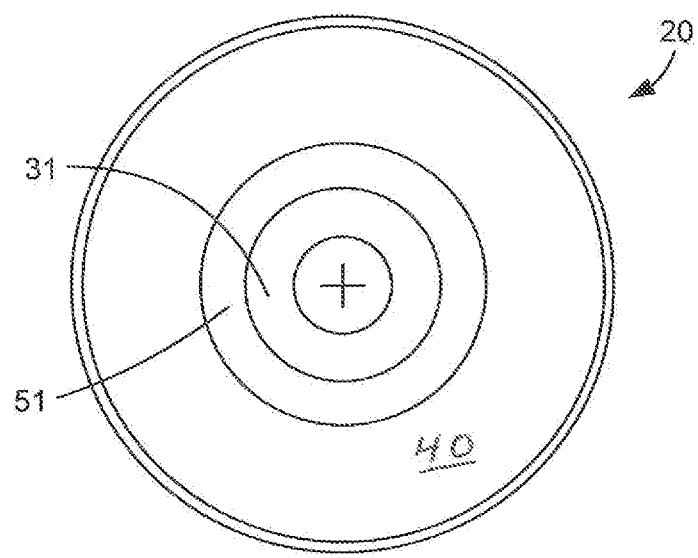
FIG. 6 is an elevated frontal view of the wheel, with the outer wheel shown in cross section in its position around the wheel hub.

FIG. 1 shows a portion of conveyor chain including a guide link 10 having a wheeled link 11 on either side thereof. A preferred embodiment horizontal guide wheel 20 is mounted in guide link 10. Guide wheel 20 includes a wheel hub 30, an outer wheel 40, a bearing race 50 for ball bearings 60 between them, whereby outer wheel 40 rotates relative to wheel hub 30. (FIGS. 4 and 5) An oiling gap 51 is located radially inwardly of bearing race 50 at the top of wheel 20, such that a direct downward path to the bearings 60 is eliminated. A blow out gap 52 widens out below bearing race 50 and opens outwardly at the bottom of wheel 20.

Wheel hub 30 is comprised of three parts, a sleeve 31 which receives a wheel axle, an upper hub member 31a and a lower hub member 31b. (FIG. 4) These components are preferably made of steel. In assembly, upper and lower hub members 31a and 31b are slipped over the end of sleeve 31, which is then swaged to trap members 31a and b in position together as shown.

Hub 30 includes a top stem 32 which projects vertically upward, and a bottom stem 36 which projects downwardly. From the base of top stem 32, hub 30 has an upper frustroconical surface 33 which slopes downwardly and inwardly to a bearing groove 34 which extends around hub 30 to define half of bearing race 50. Below bearing groove 34, hub 30 has a downwardly and outwardly sloping lower frustroconical surface 35.

Outer wheel 40 is also preferably made of steel. It includes a top surface 41 and a bottom surface 42. Oiling gap 51, bearing race 50 and blow out gap 52 are formed between the inner surface of outer wheel 40 and the outer surfaces 33, 34 and 35 of wheel hub 30. The inner surface of outer wheel 40 includes an upper inwardly and downwardly sloping frustroconical surface 43, which terminates at a circular race groove 44 which extends around the interior surface of outer wheel 40. From the bottom of race groove 40, wheel surface 45 is a downwardly and outwardly sloping frustroconical surface.

Between them, the grooves 34 and 44 of hub 30 and outer wheel 40, respectively, define bearing race 50. Similarly, the upper frustroconical surfaces 33 and 43 of hub 30 and outer wheel 40 respectively, define a downwardly and inwardly sloping oiling gap 51 which extends from the top surface 41 of outer wheel 40 downwardly and inwardly to bearing race 50. The upper opening of oiling gap 51 is offset above and laterally inwardly of bearing race 50 such that dirt and debris cannot fall directly down into bearing race 50. Further, the inside perimeter of oiling gap 51 is close to and preferably directly at vertical upper stem 32 of wheel hub 30. This serves two purposes:

(1) it makes it more difficult for dirt and debris to enter oiling gap 51 than would be the case if its opening were located radially outwardly directly above race 50, since the decreased radius of oiling gap 50 allows more of it to be shielded from dirt and debris by the upper leg of the guide link 10, and it also results in decreased open area into which dirt and debris can fall; and 2) it eliminates any upper flat surface on wheel hub 30 on which oil can pool.

The opposed downwardly sloping lower frustroconical surfaces 35 and 45 of wheel hub 30 and outer wheel 40, respectively, define the blowout gap 52 therebetween. As one proceeds downwardly from bearing race 50, blow out gap 52 increases in width, which enhances the ease with which dirt and debris in bearing race 50 can be blown out by a blast of air entering through oiling gap 51, down through bearing race 50, and outwardly through blow out gap 52. While this widening would occur if only one of the lower surfaces 35 or 45 sloped downwardly and outwardly from bearing race 50, it is preferable that both said lower surfaces extend downwardly and outwardly as shown, in order to maximize the outlet opening and make it easier for dirt and debris to be blown out by a blast of air entering from above through oiling gap 51, and easier to direct blow out air upwardly into blow out gap 52 from different angles to bearing race 50, and thereby more effectively blow dirt and debris off of and through the opposed bearing race walls 34 and 44, and the opposed walls 33 and 43 of the upper oiling gap 51.

Preferably, guide wheel 20 comprises a single bearing race 50 and a single circular row of bearings 60. The bearings used can thereby have a larger diameter, resulting in a wider oiling gap 51 and a wider blow out gap 52. The larger bearings also carry a higher load, do not have to rotate as rapidly at a given chain speed, and have a longer service life.

Figure 7:
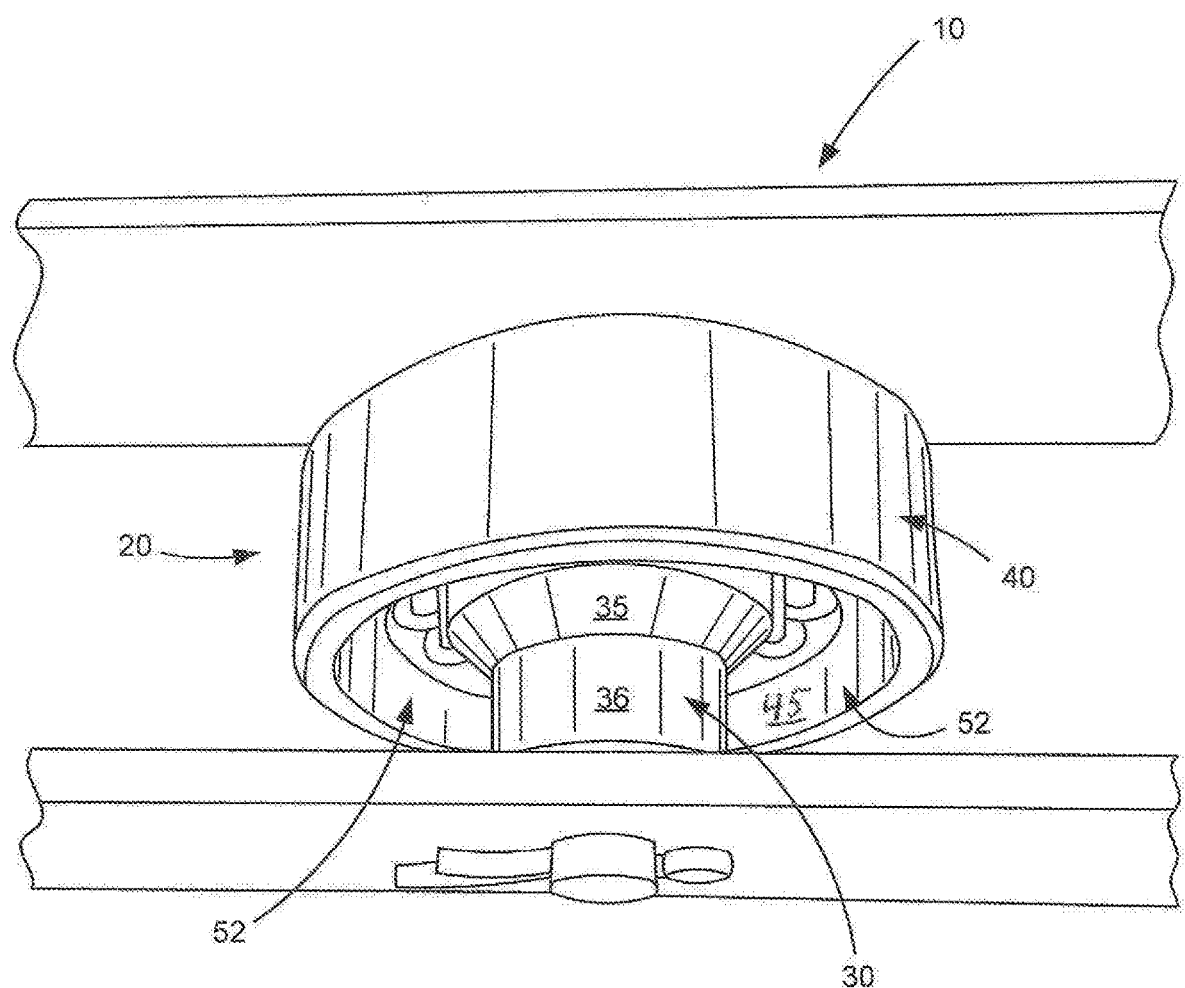
FIG. 7 is a bottom perspective view of a preferred embodiment horizontally oriented guide wheel.

FIGS. 1 and 7 show wheel 20 mounted in a guide link 10, FIG. 1 being top perspective view and FIG. 7 being a bottom perspective view. In FIG. 1, one can see the upper oiling gap 51 tucked in somewhat under the top leg of link 10. In FIG. 7, one can see the bottom blow out opening 52, the downwardly and outwardly sloping lower frustroconical surfaces 35 and 45 of hub 30 and wheel 40 respectively, as well as lower stem 36 of hub 30.

In use, oil from an oiling station is jetted into oiling gap 51 as the conveyor chain proceeds along its route. By having two or more oiling jets disposed around the perimeter of oiling gap 51, bearing race 50 and ball bearings 60 are very well oiled. The oil flows down into the bearing race 50 and bearings 60 through the downwardly and inwardly directed gap 51.

As the chain passes a blow out station, upper air blast jets can blow jets of air downwardly at an angle corresponding to the downward and inward angle of oiling gap 51. The air passes through bearing race 50 between ball bearings 60 and out through blow out gap 52, carrying dirt and debris with it.

Alternatively, or usually sequentially, air at a blow out station is jotted by multiple jets up into and through gap 52. By disposing some jets around the perimeter of frustroconical lower wall 44 of outer wheel 40 oriented to direct air more or less parallel to angled wall 44, and by orienting other air blast jets to blow up and along lower frustroconical wall 34 of wheel hub 30, one is blasting a great deal of effectively directed jets of air up through bearing race 50 and between ball bearings 60 and out through oiling gap 51, one is removing collected dirt and debris very effectively.

Of course, it is understood that the forgoing is a description of the preferred embodiments and that various changes and alterations can be made without departing from the spirit and scope of the following claims.

The invention claimed is:

1. A conveyor chain wheel for horizontal use comprising: a top surface and a bottom surface for horizontal orientation; a hub having an outer circumferential surface defining the inner surface of a bearing race; an outer wheel which is rotatable relative to said hub, having an inner circumferential surface defining the outer surface of a bearing race; a bearing race between said outer race defining surface defined by said outer circumferential surface of said hub and said inner race defining surface defined by said inner circumferential surface of said outer wheel; bearings in said bearing race; an oiling gap which extends from an upper opening in said top surface of said wheel downwardly into said bearing race whereby oil can be sprayed into said oiling gap and flow into said bearing race and said bearings located in said bearing race; said upper oiling gap opening in said top surface of said wheel being located above and radially inwardly of said bearing race, such that a direct downward path to the bearings is eliminated.

2. The conveyor chain wheel of claim 1 which also includes a blow out gap extending from said bearing race to a blow out gap opening in said bottom surface of said wheel; said blow out gap being located between said outer circumferential surface of said hub and said inner circumferential surface of said outer wheel, which define between them a blow out path which becomes wider as it proceeds downwardly from said bearing race to its opening at said bottom side of said wheel, making it easier for debris to be blown out of said bearings and said bearing race either from air blown down through said oiling gap at the top of said wheel or blown up through said blow out gap at the bottom of said wheel.

3. The conveyor chain wheel of claim 2 in which outer circumferential surface of said hub and said inner circumferential surface of said outer wheel comprise opposed frustroconical surfaces which define a frustroconical path from said oiling gap opening to said bearing race.

4. The conveyor chain wheel of claim 3 in which said blow out gap is defined between said inner circumferential surface of said outer wheel comprising a frustroconical surface extending downwardly and outwardly from said bearing race and said outer circumferential surface of said hub comprising a frustroconical surface extending downwardly and inwardly from said bearing race.

5. The conveyor chain wheel of claim 4 in which said hub includes an upper stem which extends vertically upwardly when said wheel is oriented horizontally; said oiling gap being located at and extending from said stem, such that said hub does not include a flat top surface adjacent said oiling gap on which oil could pool.

6. The conveyor chain wheel of claim 1 in which outer circumferential surface of said hub and said inner circumferential surface of said outer wheel comprise opposed frustroconical surfaces which define a frustroconical path from said oiling gap opening to said bearing race.

7. The conveyor chain wheel of claim 6 in which said hub includes an upper stem which extends vertically upwardly when said wheel is oriented horizontally; said oiling gap being located at and extending from said stem, such that said hub does not include a flat top surface adjacent said oiling gap on which oil being sprayed into said oiling gap could pool.

8. A conveyor chain having a plurality of guide links in in which guide wheels are horizontally mounted, each of said guide wheels comprising the features of the claim 1 guide wheel above.

9. The conveyor chain of claim 8 in which each of said horizontally mounted guide wheels also includes the features added to the wheel of claim 1 by claim 2 above.

10. The conveyor chain of claim 9 in which each of said horizontally mounted guide wheels also includes the features added to the wheel of claim 2 by claim 3 above.

11. The conveyor chain of claim 10 in which each of said horizontally mounted guide wheels also includes the features added to the wheel of claim 3 by claim 4 above.

12. The conveyor chain of claim 11 in which each of said horizontally mounted guide wheels also includes the features added to the wheel of claim 4 by claim 5 above.

13. The conveyor chain of claim 8 in which each of said horizontally mounted guide wheels also includes the features added to the wheel of claim 1 by claim 6 above.

14. The conveyor chain of claim 13 in which each of said horizontally mounted guide wheels also includes the features added to the wheel of claim 6 by claim 7 above.

* * * * *